United States Patent [19]
Moore et al.

[11] 3,929,934
[45] Dec. 30, 1975

[54] NOVEL FLUOROELASTOMERS IN POWDER FORM

[75] Inventors: Albert Lloyd Moore; Walter Kwei-Yuan Tang, both of Wilmington, Del.

[73] Assignee: E. I. Du Pont de Nemours & Co., Wilmington, Del.

[22] Filed: Nov. 19, 1973

[21] Appl. No.: 417,240

[52] U.S. Cl............. 260/884; 260/29.6 F; 260/900
[51] Int. Cl.² .................... C08L 27/16; C08L 27/18; C08L 27/20
[58] Field of Search ............ 260/884, 80.77, 29.6 F, 260/87.7, 900

[56] References Cited
UNITED STATES PATENTS

| | | | |
|---|---|---|---|
| 2,789,959 | 4/1957 | Smith...................... | 260/900 |
| 2,968,649 | 1/1961 | Pailthorp et al. ............... | 260/80.77 |
| 3,019,206 | 1/1962 | Robb ................... | 260/900 |
| 3,178,399 | 4/1965 | Lo...................... | 260/87.7 |
| 3,484,503 | 12/1969 | Magner et al...................... | 260/900 |
| 3,654,210 | 4/1972 | Kuhls et al........................ | 260/884 |
| 3,745,196 | 7/1973 | Lane et al........................ | 260/881 |
| 3,769,371 | 10/1973 | Nersasian........................... | 260/900 |
| 3,798,287 | 3/1974 | Murayama et al.............. | 260/878 R |
| 3,801,552 | 4/1974 | Kometani et al. ............... | 260/80.77 |

Primary Examiner—Murray Tillman
Assistant Examiner—Thurman K. Page

[57] ABSTRACT

Elastomeric fluorinated copolymers in powder form, suitable in extrusion, injection-molding and similar fabricating techniques for the formation of shaped articles are obtained by copolymerizing in aqueous emulsion in the first stage of a two-stage polymerization process vinylidene fluoride with pentafluoropropene, hexafluoropropene, chlorotrifluoroethylene, or a perfluorinated alkyl vinyl ether and optionally with tetrafluoroethylene to at least about 90% monomer conversion to a polymer having a melting point of less than about 60°C.; polymerizing in the same emulsion in the second stage at least one of the same monomers as in the first stage but in such proportions that the second stage polymer if made separately would have a melting point above 120°C.; flocculating the dispersion; and spray-drying at 121°–177°C.

13 Claims, 2 Drawing Figures

NOVEL FLUOROELASTOMERS IN POWDER FORM

BACKGROUND OF THE INVENTION

This invention relates to novel, powdery, polymeric compositions and to a process for the manufacture thereof.

Many fluoropolymers are known. Typical are polymers and copolymers of vinylidene fluoride, hexafluoropropene, tetrafluoroethylene, chlorotrifluoroethylene, and others. Depending on the nature and proportions of monomers, those polymers may be predominantly plastic or elastomeric. Blends of fluoropolymers also are known. For example, U.S. Pat. No. 2,789,959 discloses blends of vinylidene fluoride/chlorotrifluoroethylene copolymer with chlorotrifluoroethylene homopolymer.

U.S. Pat. No. 3,494,784 discloses a method of preparing dry, non-adhesive elastomeric powders, wherein a small amount of hard polymer is allowed to coagulate in the presence of a coagulate of an elastomer latex.

U.S. Pat. No. 3,745,196 describes a multistage polymerization process in which a first stage elastomeric acrylic polymer is at least partially encapsulated with subsequent elastomeric acrylic polymer.

SUMMARY OF THE INVENTION

According to the present invention, there are now provided novel fluoroelastomeric compositions in powder form, said compositions being prepared by the following process:

1. Copolymerizing in the first stage in an aqueous emulsion and in the presence of a free radical catalyst to at least about 90% monomer conversion a mixture of monomers which will result in a copolymer of about
    a. 65–100 weight percent of vinylidene fluoride (hereinafter $VF_2$) and a second monomer selected from the group pentafluoropropene (PFP), hexafluoropropene (HFP), chlorotrifluoroethylene (CTFE), and a perfluorinated $C_2$–$C_4$ alkyl vinyl ether (PFAVE), the weight ratio of $VF_2$ to the second monomer being within the range 0.67:1 to 3:1; and
    b. 0–35 weight percent of tetrafluoroethylene (hereinafter TFE),
the resulting first-stage copolymer having a crystalline melting point of less than about 60°C.;
2. polymerizing in the second stage in the same emulsion at least one of the same monomers as in the first stage but in such proportions that the second stage polymer, if made separately, would have a crystalline melting point of more than about 120°C.;
3. flocculating the resulting dispersion; and
4. spray-drying the dispersion at a temperature of about 121°–177°C.

The relative proportions of the components in the resulting polymer should be maintained within the range of about 65–90 weight percent of the first stage copolymer and 10–35 weight percent of the second stage copolymer.

DETAILED DESCRIPTION OF THE INVENTION

The relative proportions of monomers in the first and second stages necessary to produce copolymers of the required compositions can be readily calculated by one skilled in the art from either known or easily determinable polymerization rates of the individual monomers under the appropriate temperature and pressure conditions.

The first two steps of the process of the present invention, the two polymerization stages, can be carried out in sequence either batchwise in a single reactor or in a continuous, cascade, process in two separate reactors. A cascade reactor system substantially similar to that disclosed in the copending application of S. David Weaver, Ser. No. 308,855, filed Nov. 22, 1972, would be particularly suitable in the instant process.

In the practical operation of this process, $VF_2$, a second monomer from the above-defined group, and, optionally, TFE in the required ratios, water, and a water-soluble free radical generator at a concentration of about 0.001–2 weight percent based on total monomers are introduced into the first of two reactors equipped with agitating means and maintained at a temperature of about 50°–130°C. and a pressure of about 250–1500 psig at such a flow rate that at least about 90% conversion of monomers is obtained during the residence of the monomers in the reactor.

Figure 1:
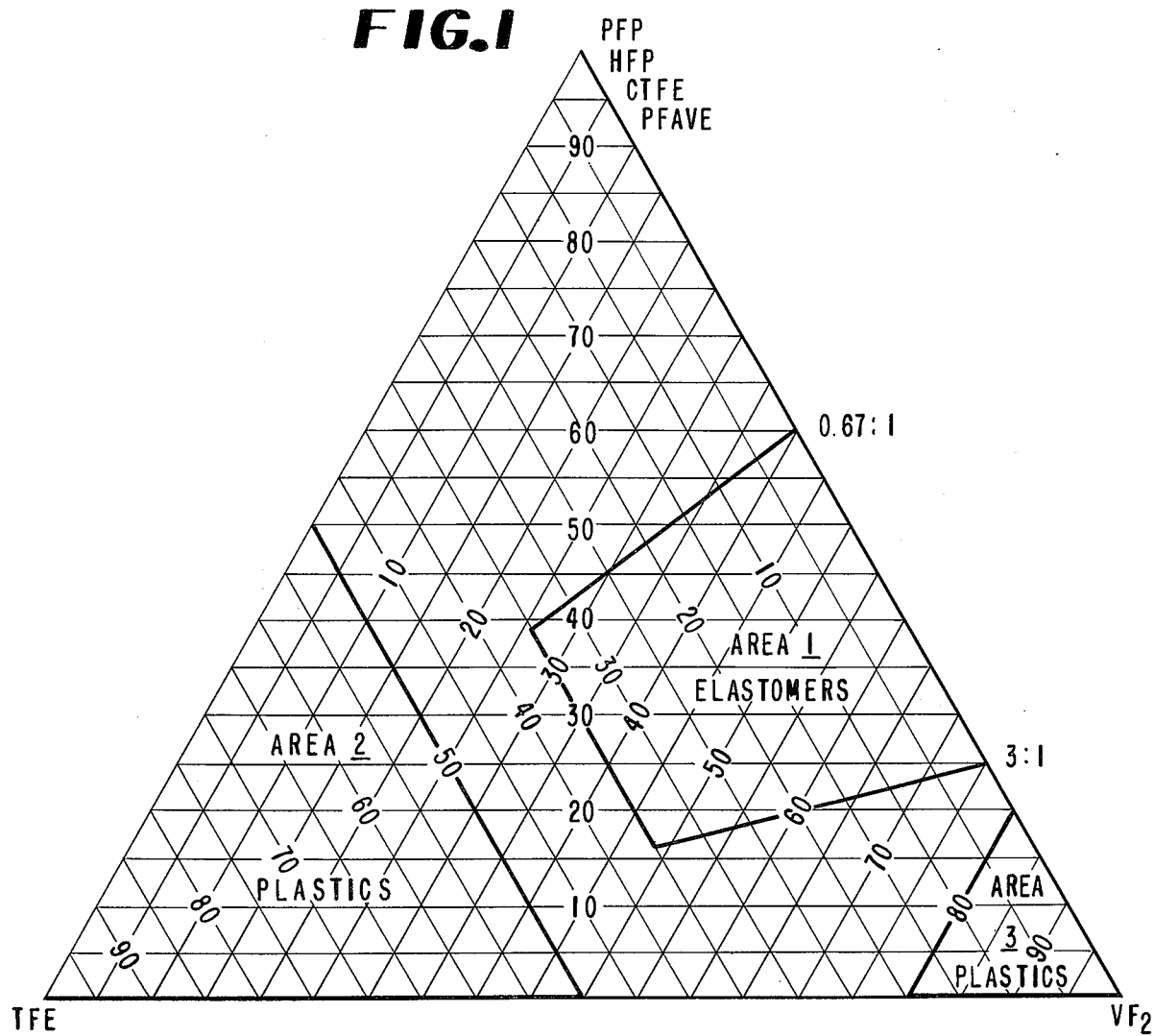
FIG. 1 is a diagram showing the elastomeric and plastic compositions of PFP, HFP, CTFE, PFAVE, $VF_2$, and TFE.

Suitable first-stage monomer combinations within the scope of this invention and suitable polymerization conditions are described, for example, in U.S. Pat. Nos. 3,051,677; 2,968,649; 2,738,343; 3,136,745; 3,235,537; 3,331,823; and 3,335,106. The resulting first-stage copolymers will have compositions shown in the diagram in FIG. 1. within Area 1. As the diagram shows, all these copolymers are elastomeric.

The product stream is withdrawn at the same rate as the materials are introduced and immediately passed to a second reactor equipped with agitating means and maintained at a temperature of about 50°–130°C., and a pressure of about 250–1500 psig.

In the second polymerization stage, additional $VF_2$ and/or TFE are introduced to the second reactor, their proportions being such that the second stage product will have a high degree of crystallinity and/or of stiffness. To achieve this goal, it is necessary to produce in the second reactor a polymer containing more than about 80 weight percent $VF_2$ or 50 weight percent of TFE. Referring again to FIG. 1, it can be seen that suitable second stage copolymers will be located either in Area 2 or in Area 3 on the diagram, both areas being in the plastic region. Compositions containing a high proportion of $VF_2$ or TFE will be highly crystalline; they have melting points of more than about 120°C.

The second stage polymers are thus formed in the presence of particles of the first-stage polymer, after the original latex has attained at least 90% polymerization. Since the effluent from the first reactor which enters the second reactor usually contains about 10% or less of unchanged starting monomers even though no additional make-up monomers other than $VF_2$ and/or TFE are added, there is normally present in the second reactor a sufficient proportion of PFP, HFP, CTFE or PFAVE to form a copolymer containing that monomer. Suitable PFAVE's include perfluorinated methyl vinyl ether, ethyl vinyl ether, and all isomers of propyl and butyl vinyl ethers.

It is to be understood that theoretically it is possible to have a quantitative conversion in the first reactor, no unchanged starting monomer from the first stage being present during the second stage polymerization. Such a situation, even though not likely to occur in a commercial process, also is within the contemplation of this invention. The critical requirement is that the polymer formed in the second stage have a melting point higher than about 120°C. The second stage polymer will thus usually be a copolymer but may in an extreme case be a homopolymer.

A chain transfer agent may be added to either stage to modify the molecular weight of the resulting polymer in a manner generally known in the art. However, normally a chain transfer agent would be considered unnecessary in the process of the present invention since it is desired to obtain high molecular weight polymers, especially in the second stage.

The latex effluent from the second reactor is flocculated in a known manner, for example, by addition of an electrolyte such as potassium alum or a polyethylene polyamine, for example, triethylenetetramine. The coagulated dispersion is spray-dried in a stream of a hot gas, especially, hot air. It is practical, although not required, to add either before or during the spray-drying operation a small amount of an anti-tack agent such as, for example, silica, calcium silicate, calcium carbonate, etc.

Figure 2:
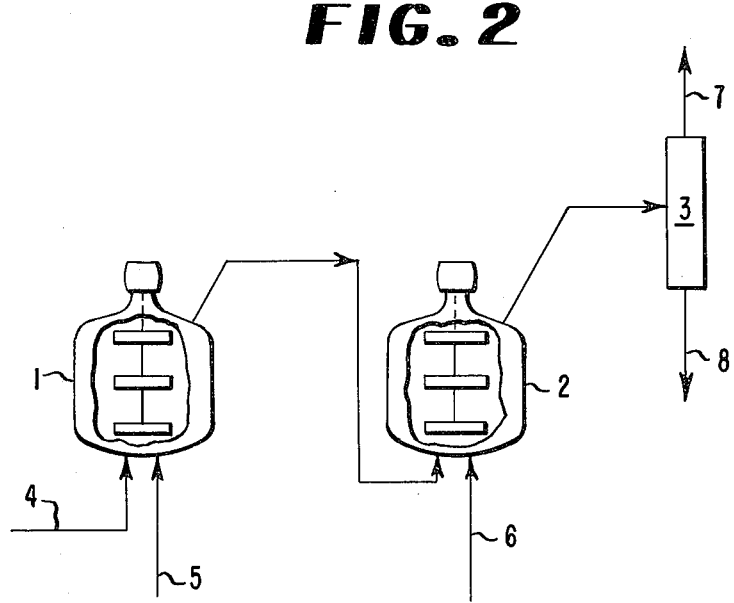
FIG. 2 illustrates the flow diagram of a cascade reactor system suitable in the process of the present invention.

A possible cascade reactor arrangement is shown in FIG. 2. The first and second reactors are designated 1 and 2, respectively. A solution of free radical generator in water is introduced into the first reactor through the feed line 4. $VF_2$, a second monomer selected from PFP, HFP, CTFE, and PFAVE, and optionally TFE, are introduced through the feed line 5, usually as compressed gases. The overflow from the first reactor is introduced at the bottom of the second reactor. Fresh $VF_2$ and/or TFE is introduced through the feed line 6. In this particular flow diagram, the catalyst is introduced only to the first reactor but not to the second reactor, and no transfer agent is used. Additional catalyst and/or chain transfer agent would require additional feed lines.

The overflow from the top of reactor 2 is introduced through a let-down valve to separator 3, from which the unchanged gaseous monomers are recovered through the vent 7, and the reaction product is withdrawn through the drain 8.

The residence time of the monomer mixture in the first reactor must be sufficient to allow the polymerizing monomers to reach a conversion of at least about 90% at a practical flow rate and the prevailing temperature and pressure. The residence time in the second reactor may be different from that in the first reactor; the relative residence times being dependent on the relative sizes of the two reactors. Such parameters as temperatures, residence times, polymerization rates and operating pressures can be adjusted for each reactor independently of the other. The free-radical generation rate depends, among others, on the catalyst feed rate. The appropriate calculations can be made both for the case where catalyst is added only to the first reactor and that where catalyst is added to both reactors using the equations given in the above-mentioned application of S. David Weaver, Ser. No. 308,855.

The polymerization is initiated by a free radical generator, which can be any inorganic persulfate, peroxide, perphosphate, perborate, or percarbonate. However, the preferred initiators are ammonium persulfate, sodium persulfate, potassium persulfate, or a mixture of two or more such compounds. The initiator can be used in combination with a reducing agent such as an alkali metal or ammonium sulfite, bisulfite, metabisulfite, hydrosulfite, thiosulfate, phosphite, or hypophosphite; or in combination with a ferrous, cuprous, or silver salt, or other easily oxidized metal compound. Such initiator systems are well known to those skilled in the art of polymerization. The preferred initiator is ammonium persulfate, without a reducing agent.

Since this polymerization is carried out in an aqueous emulsion, the reaction catalyst should be water-soluble. The catalysts such as persulfates or peroxides can be decomposed either by reducing agents in a redox system or by thermal decomposition. The pH of the reaction medium normally is quite low, for instance, from about 2 to about 7½. The solids concentration in each reactor usually is from about 10 to about 30 weight percent, a concentration of product of about 15–25 weight percent being preferred. Nevertheless, the concentration does not have to be the same in both reactors. The maximum practical concentration of solids in each reactor is about 50 weight percent since above that concentration the viscosity of the resulting latex system is too high for effective stirring. In the practical operation of this process, both reactors are filled with liquid, the back pressure being controlled.

The monomers must be under sufficiently high pressure to enter the reactors. The monomer pressure usually is maintained at about 600–900 psig, but the exact pressure is not critical, as long as it is sufficient to propel the monomers into the reactors. The preferred polymerization temperature is about 100°–130°C.

It is often useful to add to the first reactor an emulsion stabilizer such as a surfactant and/or an alkaline compound to improve the stability of latex. The alkaline compound can be, for example, sodium hydroxide, potassium hydroxide, lithium hydroxide, ammonium hydroxide, sodium phosphate, disodium phosphate, monosodium phosphate, sodium fluoride, and such. Not all surfactants are suitable in the process of this invention since ordinary aliphatic acid soaps, for example, inhibit polymerization. Fluorocarbon acid soaps are preferred. They include, for example, ammonium $\omega$-hydroperfluoroheptanoate and ammonium perfluorooctanoate. Other dispersing agents include, for example, salts of chlorendic acid. The amount of the surfactant is about 0.01–0.2% of the weight of the water used in the reaction. If alkaline compounds are used, their concentration should be preferably such as to maintain a pH of about 3.5–6 in the reactor. Alternatively, the ratio of the alkaline compounds to the initiator should correspond to about 0.1–0.25 g. of sodium hydroxide per gram of ammonium persulfate.

The product recovered from the second reactor could be considered to be a blend of the predominantly elastomeric material formed in the first reactor and of the predominantly plastic material formed in the second reactor. Yet, it is believed that the final product possesses properties different from those of ordinary intimate blends, and that the second polymer is in fact somehow attached to the first. While theoretically encapsulation of the first polymer by the second is possible, there is at present no evidence of the formation of a continuous coating of the plastic polymer on the elastomeric material. The particles of the second polymer may be partially formed within the particles of the first; or chemical bonding, i.e., grafting, may be taking place.

Flocculation of the latex recovered from the second stage brings the particle size of the polymer to about 0.5–1 micron. Spray-drying produces a product having a particle size of up to about 10 microns. The spray-drying temperature range is critical to the success of this step. The preferred lower temperature limit of incoming air is about 138°C., the most suitable temperature being up to about 157°C. The air temperature at the exit will be about 66°–93°C., preferably 71°–82°C.

Depending on the proportion of the plastic component, the spray-dried powder may have a tendency to re-agglomerate. The addition of anti-tack agent is, therefore, sometimes recommended. The amount of silica or similar agent is usually up to about 2% by weight, based on the total polymer, especially about 0.5–2% by weight, about 1% being normally satisfactory.

The powder product of the present invention is useful in extrusion, injection molding and similar fabrication techniques for the formation of shaped articles, such as gaskets, tubes, rods, and other articles. These simple fabricating techniques require conventional equipment. Powder can be continuously conveyed to fabricating equipment and formed into desired shapes. Pre-compounding can be accomplished in simple powder blenders, eliminating the necessity of heavy precompounding equipment. The novel copolymers of the present invention are also suitable in wire-coating and in similar coating applications.

This invention is now illustrated by the following representative examples of certain preferred embodiments thereof, where all parts, proportions, and percentages are by weight unless otherwise indicated.

In the following examples, glass transition temperature and crystalline melting point of the products were determined using a Du Pont 990 Thermal Analyzer, using a differential scanning calorimeter unit. This analytical technique is reported in B. Carrol, Physical Methods in Macromolecular Chemistry, Macel Dekker, New York, 1972, page 253. The inherent viscosity was determined at 30°C., in a solution containing 0.1 weight percent of polymer in a mixture of 87 weight percent tetrahydrofuran and 13 weight percent dimethylformamide.

EXAMPLE 1

Two 2L autoclaves with stirrers were arranged as shown in FIG. 2 with associated piping, flow meters, pumps, compressors and feed tanks for feeding gaseous monomers and aqueous solutions of initiator and removing the product from the second reactor. The temperature of both reactors was controlled at 110°C. by the temperature of steam/water in a jacket, and the pressure was maintained at 900 psig by a control valve at the exit of the second reactor. Gaseous monomers were measured, mixed, compressed and fed to the first reactor in one stream and a solution of ammonium persulfate initiator, sodium hydroxide and water were fed in a second stream. Vinylidene fluoride was fed at a rate of 1100 g/hr. and hexafluoropropene was fed at a rate of 900 g/hr. Ammonium persulfate was fed at a rate of 16.0 g/hr. and sodium hydroxide at 3.0 g/hr. in 8.0L of water per hour. The nominal residence time in the first reactor was thus 0.25 hr. Under these conditions the effluent of the first reactor contained 1850 g/hr. polymer (19% solids), 20 g/hr. unconverted vinylidene fluoride and 130 g/hr. unconverted hexafluoropropene (93% conversion of total monomer). This product was fed immediately to the second reactor where additional vinylidene fluoride was fed at a rate of 800 g/hr. The polymerization proceeded because of the presence in the effluent of the first reactor of undecomposed initiator (20% of initial feed). During the 0.25 hr. residence in the second reactor, additional 740 g/hr. polymer was formed to give a total of 2590 g/hr. polymer (24.5% solids) in the effluent from the second reactor; 150 g/hr. $VF_2$ and 60 g/hr. HFP remained unconverted.

The composition of the polymer formed in the first reactor was approximately 58% $VF_2$ and 42% HFP and this constituted 71% of the total product. The polymer formed in the second reactor contained approximately 91% $VF_2$ and 9% HFP and constituted 29% of the product.

The latex effluent of the second reactor was collected over a period of several hours. A solution of 0.5 wt. % triethylenetetramine in water was added until the polymer flocculated, and the flocculated dispersion was fed to a conical bottom spray-drier at a rate of 0.37–0.50 lbs./min. through a two-fluid atomizing nozzle along with air preheated to 138°–157°C. Under these conditions, the water evaporated, and a powder was collected which had an average particle size of about 50 microns and a water content of about 0.5%.

This composite product contained 68% $VF_2$ and 32% HFP. Its inherent viscosity, $\eta_{inh}$, was 0.89. Its glass transition temperature, Tg, was −20°C., characteristic of the elastomeric component, and its crystalline melting point, m.p., was 138°C., characteristic of its plastic component.

The powder (100 parts) was mixed with 30 parts MT carbon black, 6 parts calcium hydroxide, 3 parts magnesium oxide, 2 parts bisphenol AF and 0.7 part benzyltriphenylphosphonium chloride and compression-molded in a press for 10 min. at 177°C., then oven-cured 24 hours at 232°C. The elastomeric vulcanizate had somewhat higher modulus and tensile strength than a vulcanizate of the first-stage polymer alone, but its elongation and compression set were comparable. The properties of the vulcanized product were compared with those of physical mixtures of first-stage copolymer and commercial polyvinylidene fluoride in weight ratios 70:30 and 75:25, respectively. The results are shown in Table I, below.

TABLE I

|  | Product of Example 1, Second Reactor | 70% Poly-$VF_2$/HFP 30% Poly-$VF_2$ Blend | 75% Poly-$VF_2$/HFP 25% Poly-$VF_2$ Blend |
| --- | --- | --- | --- |
| 100% Modulus, psi | 1850 | 2800 | 2750 |
| Tensile strength, psi | 2500 | 2800 | 2775 |
| Elongation at break, % | 180 | 100 | 110 |
| Hardness, Shore A | 90 | 90 | 89 |
| Compression Set, 70 hrs. at 450°F., % | 43 | 59 | 74 |

The above data show that the vulcanized copolymers made by the process of the present invention have distinctly different physical properties from those of blends of equivalent composition. This especially can be seen from modulus, elongation, and compression set figures.

EXAMPLE 2

The apparatus and procedure of Example 1 were used to produce an elastomer powder from three monomers. Temperature, pressure and residence time were the same. The initiator system was ammonium persulfate (16.4 g/hr) plus sodium bisulfate (2.73 g/hr) and sodium hydroxide (3.0 g/hr) in 8.0 l/hr of water. Monomer feed to first stage and polymer produced are shown in Table II.

TABLE II

|  | Feed g/hr. | wt. % | Unchanged Monomers g/hr. | Polymer g/hr. | wt. % |
|---|---|---|---|---|---|
| $VF_2$ | 1250 | 57 | 30 | 1220 | 58 |
| HFP | 530 | 24 | 65 | 465 | 22 |
| TFE | 420 | 19 | 5 | 415 | 20 |
| TOTAL | 2200 | | | 2100 | |

The product latex was fed to the second reactor along with an additional initiator solution of 4.56 g/hr ammonium persulfate and 1.0 g/hr sodium hydroxide in 0.5 l/hr water. Monomer feed to the second stage and polymer produced are shown in Table III.

TABLE III

|  | Feed from Stage 1 g/hr. | New Feed g/hr. | Unchanged Monomers g/hr. | Second-Stage Polymer g/hr. | wt.% |
|---|---|---|---|---|---|
| $VF_2$ | 30 | 600 | 30 | 540 | 91 |
| HFP | 65 | 0 | 20 | 45 | 8 |
| TFE | 5 | 0 | 0 | 5 | 1 |
|  |  |  |  | Total 590 |  |

The overall product from the second reactor thus contained 590 g/hr. plastic polymer in a total weight of 2690 g/hr. or 22%, of the total.

The composition of this composite product was 65% $VF_2$, 19% HFP, and 16% TFE; $\eta_{inh} = 1.03$; $Tg = -25°C$. and a minor m.p. of 45°C. (both characteristic of the elastomeric component); and a major m.p. of 152°C., characteristic of the plastic component.

EXAMPLE 3

Product was made in the same way as in Example 2 except that the monomer feed to the second stage was predominantly TFE instead of $VF_2$. Monomer feed to the second stage and products are shown in Table IV.

TABLE IV

|  | Feed from Stage 1 g/hr. | New Feed g/hr. | Unchanged Monomers g/hr. | Second-Stage Polymer g/hr. | wt.% |
|---|---|---|---|---|---|
| $VF_2$ | 30 | 160 | 35 | 155 | 31 |
| HFP | 65 | 0 | 45 | 20 | 4 |
| TFE | 5 | 340 | 20 | 325 | 65 |
|  |  |  |  | Total 500 |  |

The overall product from the second reactor thus contained 500 g/hr plastic polymer in a total weight of 2600 g/hr or 19% of the total.

This composite product contained 53% $VF_2$, 19% HFP, and 28% TFE; $\eta_{inh} = 0.78$ for the soluble portion of the product (66% of total product); $Tg = -25°C$. and minor m.p. = 45°C. (both characteristic of the elastomeric component); and a major m.p. = 198°C., characteristic of the plastic component.

We claim:

1. A process for the preparation of an elastomeric, fluorinated copolymer in powder form, said process comprising the following steps:
    1. copolymerizing in an aqueous emulsion in the first stage of a two-stage polymerization process and in the presence of a free radical catalyst to at least about 90% monomer conversion a mixture of monomers which will result in a copolymer of about
        a. 65–100 weight percent vinylidene fluoride and a second monomer selected from the group consisting of pentafluoropropene, hexafluoropropene, chlorotrifluoroethylene and a perfluorinated $C_2$–$C_4$ alkyl vinyl ether, the weight ratio of vinylidene fluoride to the second monomer being within the range of 0.67:1 to 3:1, and
        b. 0–35 weight percent tetrafluoroethylene, the resulting first-stage copolymer having a crystalline melting point of less than about 60°C.;
    2. polymerizing in the second stage in the same emulsion at least one of the same monomers as in the first stage but in such proportions that the second stage polymer, if made separately, would have a crystalline melting point above about 120°C.;
    3. flocculating the resulting dispersion; and
    4. spray-drying the dispersion at a temperature of about 121°–177°C.;

the relative proportions of the components in the resulting polymer being 65–90 weight percent of the first-stage copolymer and 10–35 weight percent of the second-stage copolymer.

2. The process of claim 1 wherein the spray-drying step is carried out at 138°–157°C.

3. The process of claim 1 wherein the only fresh monomers added to the emulsion in the second stage are selected from the group consisting of vinylidene fluoride and tetrafluoroethylene.

4. The process of claim 1 which is conducted batchwise in the same reactor.

5. The process of claim 3 which is conducted in a continuous, cascade, two-reactor system.

6. The process of claim 5 which is conducted at a temperature of about 50°–130°C. and a pressure of about 250–1500 psig at such a flow rate that at least about 90% of conversion of monomers is obtained in the first reactor; the polymer produced in the second reactor containing more than 80 weight percent of vinylidene fluoride or more than 50 weight percent of tetrafluoroethylene; the concentration of the free radical catalyst in the first reactor being about 0.001–2 weight percent based on total monomers; the emulsion being introduced into the second reactor as soon as it is withdrawn from the first reactor.

7. The process of claim 6 wherein no additional free radical catalyst is added to the second reactor.

8. A fluoroelastomer in powder form prepared by the process of claim 1.

9. A fluoroelastomer in powder form prepared by the process of claim 2.

10. A fluoroelastomer in powder form prepared by the process of claim 6.

11. A vulcanizable fluoroelastomeric composition in powder form consisting essentially of
1. 65–90 weight percent, based on total polymer, of a first-stage copolymer consisting of
   a. a copolymer of 65–100 weight percent vinylidene fluoride and a second monomer selected from pentafluoropropene, hexafluoropropene, chlorotrifluoroethylene, and a $C_2$–$C_4$ perfluorinated alkyl vinyl ether, the weight ratio of vinylidene fluoride to the second monomer being within the range 0.67:1 to 3:1; and
   b. 0–35 weight percent of tetrafluoroethylene; the resulting first-stage copolymer having a crystalline melting point of less than about 60°C.;
2. 10–35 weight percent, based on the total polymer, of a second-stage polymer of at least one of the monomers of the first-stage copolymer made in the presence of an emulsion of the first-stage copolymer, said second-stage polymer having a crystalline melting point of more than about 120°C.; and
3. about 0–2 weight percent, based on the total polymer, of an anti-tack agent.

12. A composition of claim 11 wherein the amount of anti-tack agent is about 0.5–2 weight percent.

13. A composition of claim 12, wherein the anti-tack agent is silica.

* * * * *